Nov. 21, 1950   J. A. RONNING   2,530,732
SICKLE BAR MOWER
Filed May 10, 1948   5 Sheets-Sheet 1
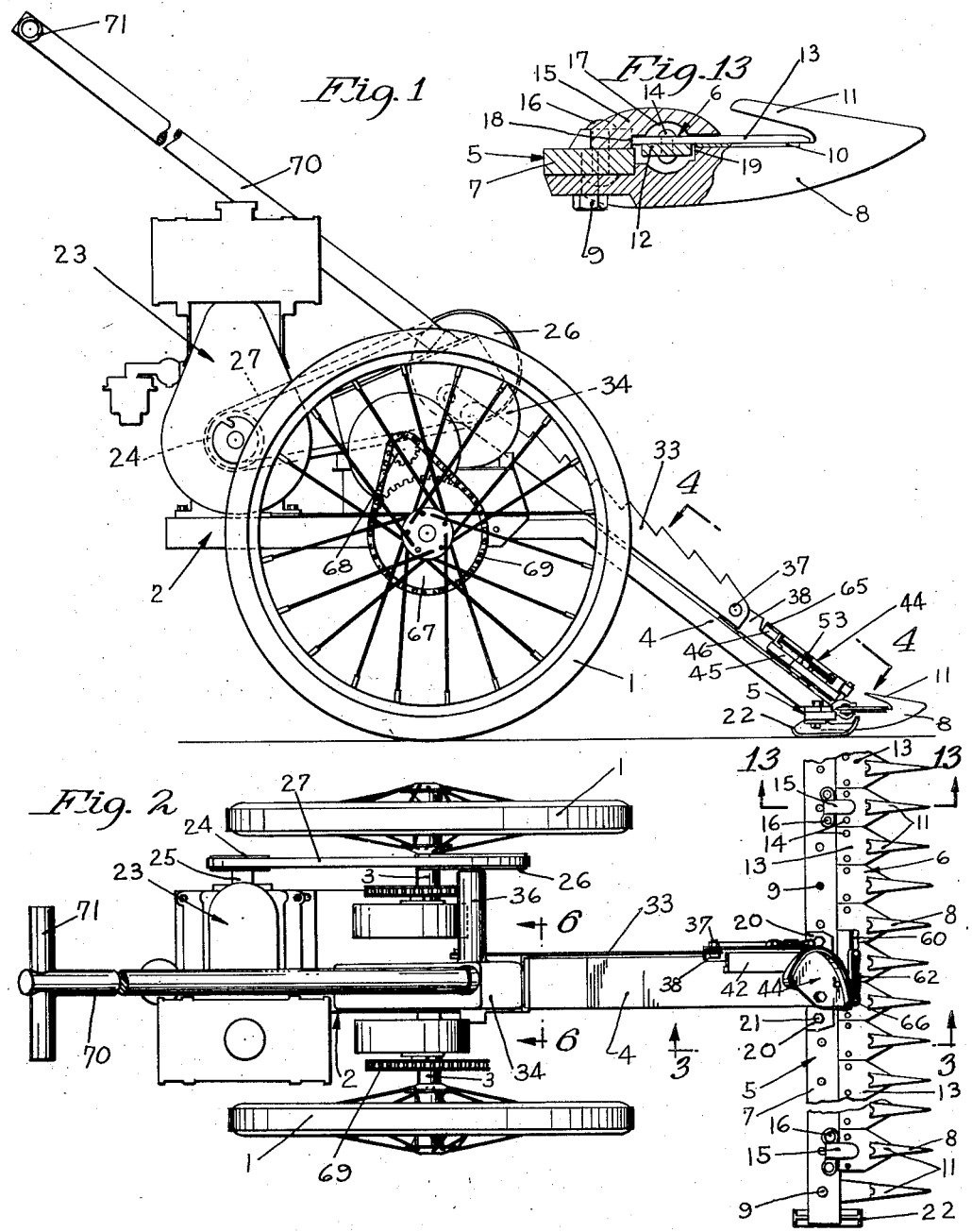
Inventor
Jacob A. Ronning
By Attorneys
Merchant & Merchant

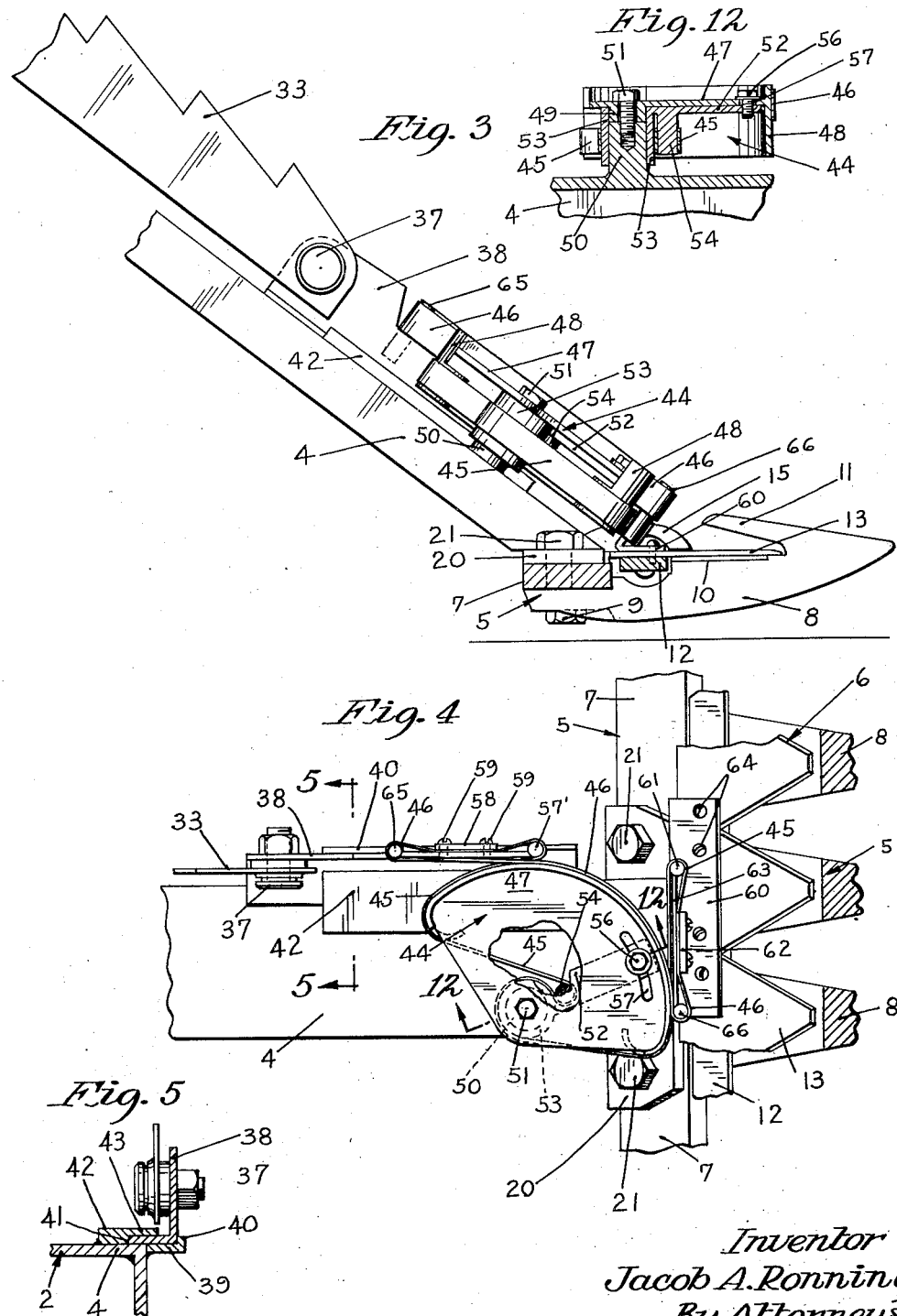

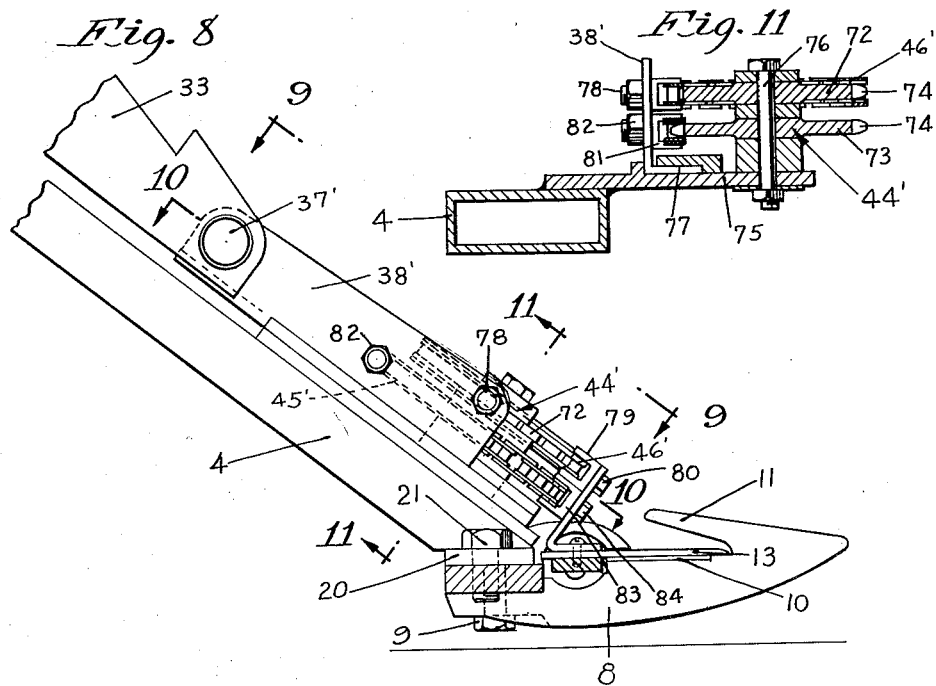
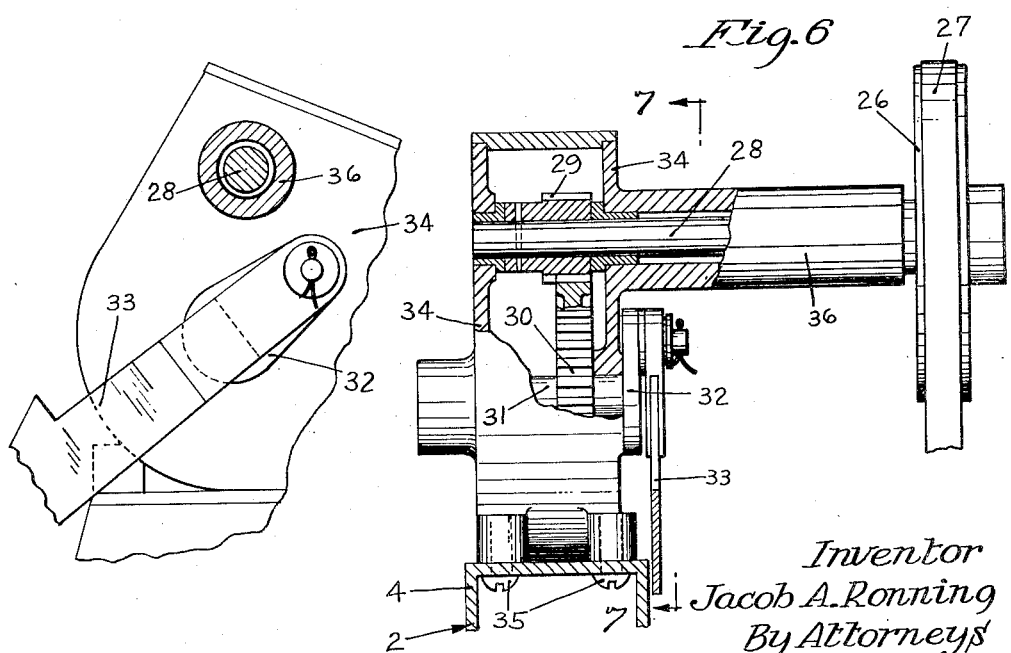

Nov. 21, 1950  J. A. RONNING  2,530,732
SICKLE BAR MOWER
Filed May 10, 1948  5 Sheets-Sheet 4
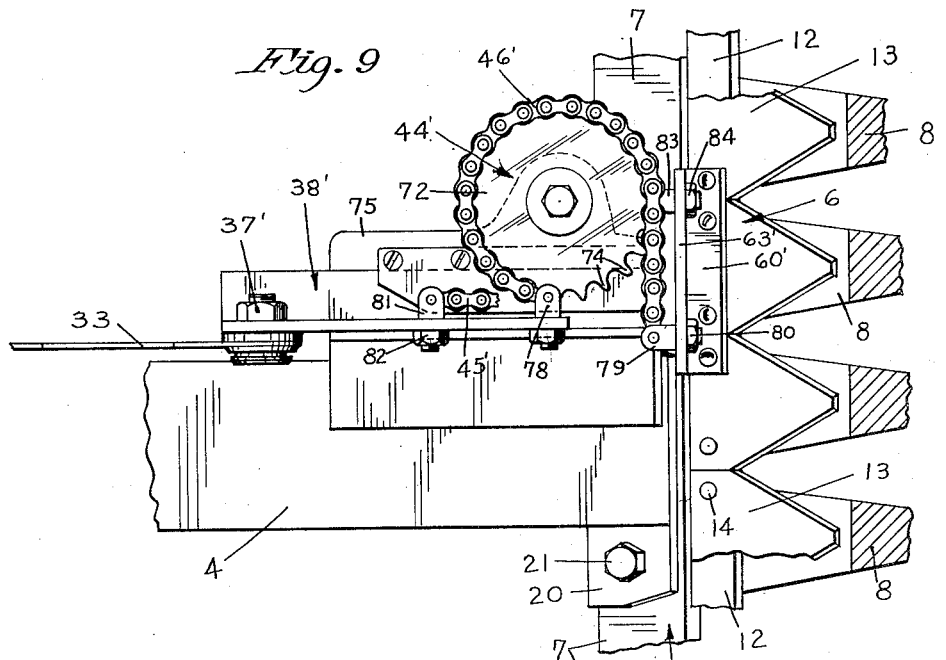
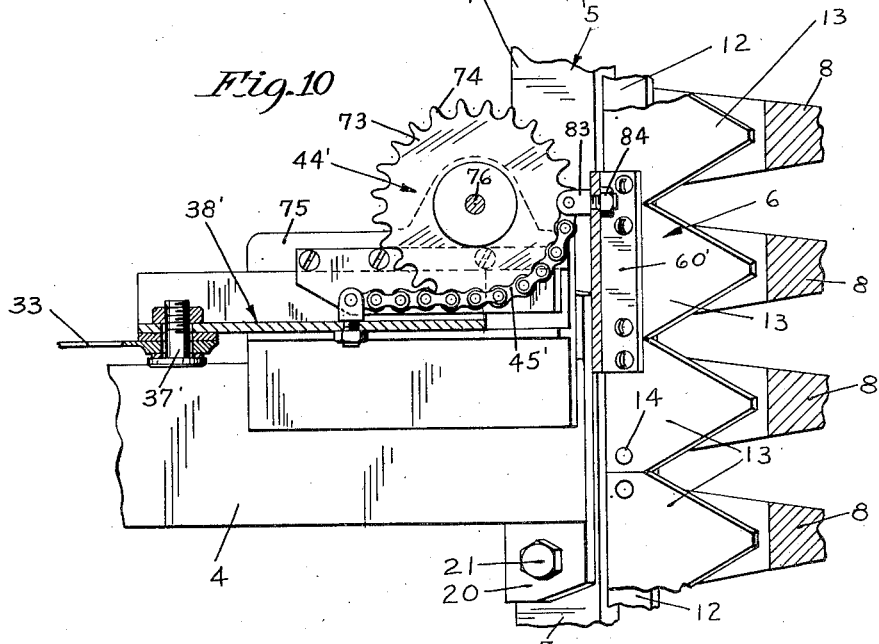
Inventor
Jacob A. Ronning
By Attorneys
Merchant & Merchant Nov. 21, 1950      J. A. RONNING      2,530,732
SICKLE BAR MOWER Filed May 10, 1948      5 Sheets-Sheet 5

Fig. 14

Inventor
Jacob A. Ronning
By Attorneys
Merchant & Merchant

Patented Nov. 21, 1950

2,530,732

UNITED STATES PATENT OFFICE 2,530,732

SICKLE BAR MOWER

Jacob A. Ronning, Minneapolis, Minn.

Application May 10, 1948, Serial No. 26,169

11 Claims. (Cl. 56—26.5)

My present invention relates to improvements in sickle bar mowers and more particularly to improvements in driving mechanisms for the reciprocating cutting bars or knife heads of such mowers.

The cutting mechanisms of mowers of the sickle bar type comprise cooperating elongated toothed cutting bars that are subject to relative linear reciprocation, and which extend generally transversely of the direction of travel of the machine. The power for producing the relative reciprocation between the cooperative toothed cutting bars is usually applied through power transmission mechanism involving power transmission connections extending at an angle, usually a right angle, to the length of the cutting bars and the direction of relative reciprocation thereof, and motion direction converting transmission connections located closely adjacent the relative reciprocatory cutting bars. Since, in this type of mower, cutting is accomplished by a shearing action between the relatively reciprocating toothed cutting bars, the overall cutting efficiency of such mowers depends to a very large extent upon the maintaining of the relatively reciprocating toothed bars in close face to face contact from end to end thereof, with uniform pressure therebetween at all points along the length thereof. In the past, however, this desirable condition has been difficult to achieve or maintain due to the fact that the transmission mechanisms heretofore employed for the purpose of producing relative reciprocation of the cooperating toothed cutting bars have always had a tendency to deflect one of the relatively reciprocating bars with respect to the other thereof in a direction or directions angular to the length of the bars, this being due to the fact that prior art power transmitting connections to the reciprocating cutting bars of such mowers have applied the driving energy to the reciprocating bars in a direction or directions angular to the lengths of the reciprocating bars and the line of reciprocation thereof during all or part of each operating cycle. In an attempt to overcome these difficulties, many workers in prior art have been forced to resort to the use of relatively heavy reciprocating cutting bars and other parts which, at best, only partially solved the problem and was disadvantageous in that it added weight and increased the vibration produced by the reciprocating parts.

Generally speaking, it is a primary objective of the instant invention to overcome the above noted objectionable characteristics of prior art machines of this kind, and to this end I provide an improved structure wherein the energy for reciprocating a reciprocatory cutting bar is always applied thereto at fixed, non-shifting points thereon, and always in a uniform direction parallel to the length and direction of reciprocation of the cutting bars. As a result of this important feature of my invention, any tendency of the power transmission mechanism to deflect one of the cooperating cutting bars with respect to the other thereof or with respect to the natural path or line of reciprocation thereof is substantially or entirely eliminated. Hence, in machines built in accordance with the instant invention, little difficulty is encountered in maintaining the cooperating toothed cutting bars in uniformly close working engagement throughout their lengths. With this difficulty eliminated, the use of lighter than usual reciprocating cutting bars is made practical and, of course, the use of lighter reciprocating parts materially reduces the vibration of the machine thereby saving wear and tear on the machine, in general, and also on the operator of the machine. Furthermore, the elimination of deflecting forces on the reciprocating cutting bars of such machines simplifies the problem of guiding the relatively reciprocating cutting bars for true, straight line reciprocation, one with respect to the other, which immediately suggests the use of less, more widely spaced and fewer retaining or hold-down clips, with a consequent reduction in initial cost and frictional power losses. Hence, my invention results in increased cutting efficiency, reduced initial machine cost, unusually smooth and vibration-free operation and long life of the machine, in general, and the reciprocating cutting mechanism, in particular.

The above and other highly important objects and advantages of the instant invention will become apparent from the following specification, claims and appended drawings.

In the accompanying drawings, like characters indicate like parts throughout the several views.

Referring to the drawings:

Fig. 1 is a view in side elevation of a machine embodying the instant invention;

Fig. 2 is a plan view, with some parts broken away, of the machine of Fig. 1;

Fig. 3 is an enlarged fragmentary sectional view taken on the line 3—3 of Fig. 2;

Fig. 4 is a fragmentary view in elevation taken on the line 4—4 of Fig. 1 and enlarged to the scale of Fig. 3;

Fig. 5 is a detail sectional view taken on the line 5—5 of Fig. 4;

Fig. 6 is an enlarged sectional view taken on the line 6—6 of Fig. 2, with some parts broken away, and some parts shown in section;

Fig. 7 is a fragmentary detail view taken on the line 7—7 of Fig. 6;

Fig. 8 is a view corresponding to Fig. 3 but showing a slightly modified form of the invention;

Fig. 9 is a fragmentary plan view taken on the line 9—9 of Fig. 8;

Fig. 10 is a fragmentary plan view similar to Fig. 9, but taken on the line 10—10 of Fig. 8;

Fig. 11 is a detail sectional view taken on the line 11—11 of Fig. 8;

Fig. 12 is a detail sectional view taken on the line 12—12 of Fig. 4;

Fig. 13 is an enlarged detail sectional view taken on the line 13—13 of Fig. 2, and with some parts on the section line shown in full; and Fig. 14 is a fragmentary plan view corresponding to Figs. 3 and 8, but illustrating a still further modification of the invention.

Referring with greater particularity to the drawings, a pair of laterally spaced ground wheels are indicated by 1 and the frame of the machine is indicated as an entirety by 2. The frame 2 is mounted fast on opposite ends of an axle 3, and the frame 2 is suitably journalled upon the axle 3. The frame 2 is provided with a forwardly and downwardly projecting tongue-like portion 4 located in the vicinity of the transverse center of the machine.

The reciprocating type cutting mechanism of the machine is mounted on the outer end of the frame tongue 4 and comprises cooperating relatively reciprocatory toothed cutting bars indicated as entireties by 5 and 6, respectively. In the preferred embodiment of the invention illustrated, the cutting bar 5 takes the form of a more or less conventional finger bar and is mounted fast on the end of the frame tongue 4, and the toothed cutting bar 6 overlies and is mounted for linear reciprocation on the finger bar 5 and takes the form of a more or less conventional sickle bar or knife head. The so-called finger bar 5 is a composite structure comprising a rigid beam 7 equipped with fingers or teeth 8 at uniformly spaced points lengthwise thereof and detachably secured fast thereon by head-equipped screws 9. The cutting surfaces of the fingers or teeth 8 are formed by hardened steel insets 10, according to conventional practice. Also, in accordance with conventional practice, the fingers or teeth 8 are shown as provided with upwardly and rearwardly projecting guard portions 11. As shown, the reciprocatory toothed sickle bar is also a composite structure and involves a beam portion 12 carrying a multiplicity of cutting blades or teeth 13 secured thereto by rivets or the like 14 and projecting over and working in face to face contact with the upper surfaces of the elements 10 of the fingers 8.

The toothed sickle bar 6 comprising beam 12 and teeth or cutting blades 13 is retained against upward and rearward shifting movements with respect to the underlying finger bar 5 by retaining or guiding clips 15 of conventional form. These clips 15 are secured fast to the upper surface of the beam 7 of the finger bar 5 by rivets or the like 16, and project over and work against the upper faces of the blades or teeth 13 of the sickle bar 6. These clips 15 are applied at spaced points along the finger bar 5 and are recessed at 17 to receive the heads of rivets 14.

By reference particularly to Fig. 13, it will be seen that the flat rear ends of the knives or teeth 13 work against shoulders 18 of the clips 15, and that the smooth front edge of the beam 12 works against shoulders 19 of the fingers 8. Hence, it will be seen that the sickle bar 6 as an entirety is guided for true straight line reciprocating motion over the cooperating finger bar 5.

The free end of the frame tongue 4 is provided with a mounting flange 20 which overlies the beam 7 of the finger bar 5 and is anchored rigidly thereto by cap screws or the like 21. The point of connection of the frame tongue 4 to the beam 7 of the finger bar 5 is substantially at the longitudinal center thereof, and said finger bar 5 and the sickle bar 6 are at right angles to the tongue 4 and extend outwardly well beyond the vertical planes of the outer surfaces of the wheels 1.

By reference particularly to Figs. 1 and 2, it will be seen that the finger bar 5 is provided at its extreme outer ends with runner-like ground engaging shoes 22, which are bolted or otherwise rigidly secured to the beams 7 of the finger bar 5 and serve to maintain the cutting surfaces of the bars 5 and 6 in suitably spaced relation to ground level.

The toothed sickle bars 6 of all forms of the invention herein illustrated are driven from suitable source of power, such as an internal combustion engine 23 mounted on the frame 2 rearwardly of the axle 3, and power transmission mechanism comprising a V-groove pulley 24 on the engine shaft 25, a speed-reducing V-groove pulley 26, a V-belt 27 running over the pulleys 24 and 26, a shaft 28 on the outer end of which the pulley 26 is mounted for common rotation, a spur pinion gear 29 fast on the shaft 28, a speed-reducing gear 30 mounted fast on a shaft 31, a crank 32 mounted fast on one end of shaft 31, and a forwardly and rearwardly extending pitman arm 33. The gears 29 and 30 are contained within a gear box 34 that is mounted on the rear portion of the tongue 4 of frame 2 by screws or the like 35 (see particularly Fig. 6). The shaft 31 is journalled in suitable bearings in the sides of the gear box 34, and the shaft 28 is similarly journalled in the sides of the gear box 34 and in a long bearing sleeve 36 integrally formed with the gear box 34.

All the mechanism described above is common to all figures of the drawings. However, the power transmission mechanism intermediate the front end of the pitman arm 33 and the toothed sickle bar 6 constitutes an important feature of the present invention, and for that reason I have illustrated in the drawings three forms of the transmission mechanisms between the said pitman arm and the sickle bar 6, one form being illustrated particularly in Figs. 1 to 5, inclusive, 12 and 13, another form being shown particularly in Figs. 3 to 11, inclusive, and the third form being shown in Fig. 14.

Referring now to Figs. 1 to 5, inclusive, 12 and 13, it will be seen that the front end of the pitman arm 33 is pivoted at 37 to a slide 38 which is L-shaped in cross-section (see particularly Fig. 5), and is mounted for forward and rearward reciprocating movements on the frame tongue 4. The bottom of the L-shaped slide 38 works partly over the upper flat surface of the tongue 4 and partly over a shelf-like supporting ledge 39 welded or otherwise rigidly secured to the tongue 4 and having its upper surface in a plane common to that of the upper surface of the tongue 4. The laterally outer edge of the shelf-like ledge 39 is upturned to provide a guide flange 40 for the slide 38. The slide 38 is held against lateral shifting movements in one direction by the flange 40, and in the opposite direction by a shoulder 41 of a guide member 42 welded or otherwise rigidly secured to the upper surface of the frame tongue 4, and which has a tongue portion 43 working over the upper surface of the bottom flange of the L-shaped slide 38 to retain the same against upward displacement. As will be seen, the slide 38 is located in rather closely rearwardly spaced relation to the cutting bars 5 and 6 and is guided for reciprocation in a straight line angular to the lengths of and direction of relative reciprocation of the bars 5 and 6.

The power transmission mechanism between the pitman arm 33 and the reciprocatory sickle bar 6 comprises a slide 38 of L-shaped cross-section, an oscillatory member 44 pivoted on the frame tongue 4, and a pair of flexible members 45 and 46, respectively. Preferably, and as illustrated, the oscillatory member 44 is in the nature of a wheel segment comprising a flange 47 and having a segmental rim portion 48, the outer face of which is arcuate, the flange 47 being formed with a hub 49 that is journalled on the upper end of a stub shaft 50 through the medium of a headed screw 51, the axis of the oscillatory member 44 being concentric with the axis of the generally arcuate face of the rim portion 48. The stub shaft 50 projects from the upper surface of the tongue 4 and is rigid therewith. The flexible members 45 and 46 extend in opposite directions about the oscillatory member 44 and work over the generally arcuate face of the segmental rim portion 48. Corresponding end portions of the flexible members 45 and 46 are anchored to the slide 38 at spaced points lengthwise of the direction of reciprocation thereof, and the opposite corresponding ends of the flexible members 45 and 46 are anchored to the sickle bar 6 at points spaced lengthwise thereof. Located beneath the flange 47 of the oscillatory member 44 is a tensioning lever 52, this lever having a tubular portion 53 that is journalled on the stub shaft 50 and the hub 49 of the member 44 so that it is adjustably pivotally movable about the axis of the member 44. This arm or lever 52 is provided at its intermediate portion with a depending post-like boss 54 and at its free end carries a headed lock screw 56 that works in a segmental slot 57 in the flange 47 of member 44 and which slot limits axial adjusting movements of the arm 52. Obviously, however, when the lock screw 56 is tightened, the arm 52 will be locked in set position.

In the form of the invention illustrated in Figs. 1 to 5, inclusive, 12 and 13, the flexible members 45 and 46 are in the nature of thin, flat ribbon-like bands of spring metal having suitable flexing qualities and tensile strength—spring bronze having been found particularly suitable for the purpose. The flexible band 45 is anchored to the upstanding flange of the L-shaped slide 38 by means of an anchoring post 57', clamping plate 58, and clamping screws 59. This flexible band 45 extends from the anchoring post 57' in a counterclockwise direction about the oscillatory member 44, spanning the space between the ends of the segmental flange 48 on the inside of the flange, and is anchored to the sickle bar 6 through the medium of an anchoring plate 60, an upstanding anchoring post 61 rigid with the plate, and a clamping plate 62 having screw threaded engagement with an upstanding flange 63 of the plate 60. The anchoring plate 60 is anchored to the upper surface of the reciprocatory sickle bar 6 by means of clamping screws or the like 64, and the anchoring post 61 is welded or otherwise rigidly secured to one end of the flange 63. One end of the flexible member or band 46 is anchored to the slide 38 through the medium of an anchoring post 65 corresponding to the anchoring post 57', and the clamping screw-equipped clamping plate 58 extends in a clockwise direction about the segmental flange 48 of member 44 from the anchoring post 65 and is anchored at its other end to an anchoring post 66 rigid with the plate 60 and corresponding to the anchoring post 61.

In order to adjustably vary the tensions of the bands 45 and 46, the intermediate part of that portion of band 45 spanning the space between the ends of the segmental flange 48 on the inside of the said flange is looped around the post-like boss 54 of the adjusting arm 52 and around the hub portion 53 of the arm 52, as shown best in Figs. 4 and 12. With this arrangement, the tension of the flexible members may be adjustably increased by pivotally moving the arm 52 in a clockwise direction with respect to Fig. 4, the arm being subsequently locked in position by means of the lock screw 56.

In the machine from which the drawings hereof were made, suitable transmission mechanism was provided for driving the ground wheels 1 from the engine 23, but since this portion of the machine is outside the scope of the present invention, no attempt has been made to completely illustrate the wheel driving mechanism. This wheel driving mechanism does, however, comprise chain sprockets 67, sprockets 68, link chains 69 running over the sprockets 67 and 68, and other elements not illustrated in sufficient detail to justify designation by numeral. Insofar as the instant invention is concerned, it makes no difference whether the machine be advanced manually or by mechanical means. As illustrated, the machine is of the two-wheel variety adapted for guidance by a walking operator, and for which purpose it is provided with a rearwardly and upwardly extending handle bar 70 equipped at its outer end with a handle 71. The handle bar 70 is anchored fast to the frame 2 through the medium of the gear box 34 to which the front end portion of the handle bar is rigidly anchored.

By reference particularly to Figs. 2 and 4, it will be seen that both ends of the flexible band members 45 and 46 are tangential to the outer arcuate face of the segmental rim 48 of member 44 and that said flexible band members extend parallel to the sickle bar 6 and the line of reciprocation thereof from the arcuate face of rim portion 48 to their respective anchoring posts 66 or 61, and that said band members 45 and 46 extend parallel to the slide 38 and the line of reciprocation thereof from the arcuate face of flange 48 to their respective anchoring posts 57' or 65. In the construction described, the anchoring posts 61 and 66 serve as the fixed space points of anchorage of corresponding ends of the flexible band members 45 and 46 to the sickle bar, and the spaced anchoring posts 57' and 65, respectively, provide fixed spaced points of anchorage of the other corresponding ends of the flexible band members 45 and 46, respectively, to the slide member 38.

*Operation—Figs. 1 to 7, inclusive, 12 and 13*

When the engine 23 is operated, the crank 32 will be rotated through the transmission mechanism described in a counterclockwise direction with respect to Fig. 7, and motion of the crank will be transmitted to the slide 38 through the pitman arm 33. The slide will now reciprocate rapidly in the guide described in a straight line, substantially at a right angle to the relatively reciprocating bars 5 and 6, this reciprocating motion of the slide 38 being, in turn, transmitted to the sickle bar 6 by the flexible band members 45 and 46 operating about the arcuate face of member 44, which, member 44, will oscillate about its axis. Of course, the flexible band member 45 pulls the sickle bar 6 in one direction and the flexible band member 46 pulls the sickle bar in the opposite direction.

As indicated in the introduction, an important feature of the invention is the fact that the flexible members 45 and 46 always apply driving energy to the sickle bar 6 at fixed points thereon and in a direction parallel to the sickle bar and the line or path of reciprocation thereof, so that there is no tendency to deflect the sickle bar with respect to the cooperating finger bar.

In the modified form of the invention shown in Figs. 8 to 11, inclusive, the transmission mechanism connecting the front end of the pitman arm 33 to the sickle bar 6 comprises a slide 38' which corresponds to the slide 38 of Figs. 1 to 5, and which is pivoted to the front end of the pitman arm 33 at 37', an oscillatory member 44', which corresponds broadly to the oscillatory member 44 of Figs. 1 to 4, and a pair of flexible members 45' and 46', corresponding respectively to the flexible members 45 and 46 of Figs. 1 to 4. The slide 38' is guided for straight line forward and rearward reciprocating movements on the frame tongue 4 in substantially the manner described in connection with the slide 38 of Figs. 1 to 4. The oscillatory member 44' of Figs. 8 to 11 inclusive is a composite structure comprising a coaxial pair of wheels 72 and 73, respectively. The circular rim portions of the rims 72 and 73 of member 44' together define the two sections of a generally circular peripheral face of member 44', which, face, is equipped with two series of circumferentially-spaced sprocket teeth 74. The concentric wheels 72 and 73 of the oscillatory member 44' are pivoted to the frame tongue 4 through the medium of a mounting flange 75 and pivot bolt 76. Broadly speaking, the oscillatory member 44' is the equivalent of the oscillatory member 44 of Figs. 1 to 4, inclusive, and also may be said to have an arcuate face, since any section of the circular face of the member 44' is arcuate. The mounting flange 75 is welded or otherwise rigidly secured to the tongue 4 and projects laterally therefrom and, by reference particularly to Fig. 11, it will be seen that the slide 38' is slidably mounted directly on the upper surface of this flange 75, the flange 75 being formed to provide a suitable guideway 77 for the slide 38'. The flexible members 45' and 46' of Figs. 8 to 11 are in the nature of link chains having intermeshing engagement with the teeth 74 of the oscillating member 44'. The flexible member 46' is anchored at one side to the slide 38' by a nut-equipped bolt 78, passes clockwise about an arcuate portion of wheel 72 of member 44' and is anchored at its other end to the sickle bar 6 through the medium of an L-shaped anchoring plate 60' corresponding broadly to the anchoring plate 60 of Figs. 1 to 5, and an anchoring lug 79 and nut-equipped anchoring bolt 80. The flexible member 45' is anchored at one end to the slide 38 by an anchoring lug 81 and nut-equipped anchoring bolt 82, passes in a counterclockwise direction about an arcuate portion of the wheel 72 of member 44' and is anchored at its other end to the sickle bar 6 through the medium of an anchoring lug 83 and nut-equipped anchoring bolt 84.

By reference particularly to Figs. 9 and 10, it will be seen that the flexible chain members 45' and 46' are parallel to the sickle bar 6 and the line of reciprocation thereof from the generally arcuate faces of wheels 72 and 73 of member 44' to their points of anchorage to the sickle bar, so that driving energy is always applied thereby to the sickle bar at fixed points thereon and in a straight line parallel to the sickle bar 6 and the direction of reciprocation of the sickle bar.

Since the operation of the mechanism of Figs. 8 to 11, inclusive, is substantially identical to the mechanism of Figs. 1 to 5, inclusive, a detailed description is not deemed necessary. It may be said, however, that the form of transmission mechanism shown in Figs. 1 to 5, inclusive, has the advantage over that shown in Figs. 8 to 11, inclusive, of being somewhat cheaper to construct because it utilizes simpler and less expensve parts, and further because it is lighter and has less tendency to be a source of vibration.

Referring now to Fig. 14, it will be seen that I have here shown a still further form of power transmission mechanism intermediate the forward end of the pitman arm 33 and the sickle bar 6, and which also has the characteristic advantage mentioned in connection with the devices of Figs. 1 to 13, inclusive, which is the application of reciprocating energy to the sickle bar at fixed points thereon and always in a direction parallel to the sickle bar and the direction of reciprocation or line of reciprocation thereof. While this Fig. 14 was previously described as being a view generally corresponding to Fig. 4, attention is, nevertheless, directed to the fact that Fig. 14 shows some of the parts positioned in a different portion of the operating cycle than does Fig. 4. In this form of the invention, the oscillatory member, which is indicated as an entirety by 44'', oscillated from the pitman arm 33 by direct crank connection, rather than through flexible members as in the devices of previous figures. As shown, the oscillatory member 44'' has a flange portion 47'' which broadly corresponds to the flange portion 47 of Figs. 1 to 4, inclusive, and is pivoted to the frame tongue 4 in exactly the same manner and by the same means as is the oscillatory member 44 of Figs. 1 to 4. As shown, the flange portion 47'' is integrally formed with a bell crank arm 85 having an upstanding crank pin 86 and having an enlarged generally spherical head providing part of what is commonly referred to as a ball and socket joint with the pitman arm 33. The outer or socket forming portions of this ball and socket joint are formed by opposed socket forming members 87 and 88 mounted on the front end of the pitman arm 33 by means of nut-equipped screws or the like 89. The flange portion 47'' of the oscillatory member 44'' is formed with an upstanding rim portion 48'' which broadly corresponds to the rim portion 48 of Figs. 1 to 4, inclusive, and 12. This rim portion 48'' has a generally arcuate face portion 90 concentric with the axis of oscillation of the member 44'' and which extends between points X—X, the ends X—X of said arcuate face portion 90 being tangential with smaller radius semi-circular face portions 91 that are connected by a flat face portion 92. As illustrated in Fig. 14, oscillatory motion of the member 44'' is transmitted to the reciprocatory sickle bar 6 by means of flexible members 93 and 94, respectively, in the nature of flat flexible metallic bands substantially like that forming the flexible band members 45 and 46 of Figs. 1 to 4, inclusive, and others. In this form of the invention, corresponding ends of the flexible band members 93 and 94 are anchored, the former above the latter, against the flat face portion 92 of the flange 48'' by means of a clamping plate 95 and anchoring screws 96 and extend in opposite directions from their points of anchorage to the member 44'' about the concentric generally arcuate face 90 thereof and have their opposite corresponding ends anchored to the sickle bar at fixed spaced points thereon represented by anchoring posts 61 and 66 corresponding to the similarly numbered anchoring posts of Figs. 1 to 4. The anchoring posts 61 and 66 are connected to the sickle bar 6 in the same manner as in Figs. 1 to 4 and by correspondingly numbered parts, and the last said end portions of the flexible members 93 and 94 are looped around the posts 61 and 66 and anchored to the flange 63 by a screw-equipped anchoring plate 62 just as in Figs. 1 to 4.

By reference to Fig. 14, it will be apparent that the extended end portions of the flexible band members 93 and 94 are tangential to the generally arcuate surface 90 of member 44'' and are parallel to the sickle bar from the member 44'' to their points of anchorage on the sickle bar represented by posts 61 and 66, respectively. Hence, in this form, as in the other forms of the invention previously described, reciprocating energy is transmitted to the sickle bar 6 always to fixed points thereon and always in a straight line parallel to the sickle bar and its direction of reciprocation.

By reference particularly to Figs. 3 and 4, it will be seen that the radius of the arcuate face of the flange 48 of the oscillatory member 44 is greater than the throw or distance of travel of the slide 38, which latter is approximately the distance between the centers of slide anchoring posts 65 and 57'. The importance of this feature resides in the fact that it prevents a collision between the slide 38 and any of the parts upstanding from the sickle bar to provide anchorage for the band elements 45 and 46, such as elements 60, 63, 61 and 66, in the event of breakage of a flexible band member 45 or 46. This same principle may, of course, be advantageously employed in connection with the structure of Figs. 8 to 10, inclusive. In the structure of Fig. 14, a similar result is achieved by making the radius of the oscillatory member 44'' greater than the throw of the forward end of the pitman arm 33.

While I have herein described several embodiments which my invention may assume in practice, it will, of course, be understood that the same is capable of further modification without departing from the spirit and scope of the invention as expressed in the following claims.

What I claim is:

1. For use with a reciprocatory type mower including a frame, and a pair of cooperating toothed cutting bars mounted and guided on the frame for relative linear reciprocation; an oscillatory member pivoted to the frame in close proximity to said bars and midway between the ends thereof, said oscillatory member having a generally arcuate face concentric with its axis, a flexible power transmission member extending circumferentially about the generally arcuate face of the oscillatory member and having one end portion thereof anchored fast to the oscillatory member, the other end portion of the flexible member extending tangentially from said arcuate face in close proximity to and parallel with one of the relatively reciprocatory cutting bars to which it is anchored, and power transmission mechanism on the frame for imparting pivotal oscillatory motion to the oscillatory member, the last said mechanism comprising a power-driven crank remote from the oscillatory member and a pitman arm connected at one end to said crank and at its other end to the oscillatory member.

2. For use with a reciprocatory type mower including a frame, and a pair of cooperating toothed cutting bars mounted on the frame intermediate their ends and guided thereon for relative linear reciprocation; an oscillatory member pivoted on the frame in close proximity to said bars and midway between the ends thereof, said oscillatory member having a generally arcuate face concentric with its axis, a pair of power transmission members extending circumferentially about the said generally arcuate face of the oscillatory member, corresponding end portions of the flexible members extending tangentially in opposite directions from the generally arcuate face of the oscillatory member and being anchored each to a relatively reciprocatory cutting bar, the said flexible members extending parallel to the cutting bar from the generally arcuate face of the oscillatory member to their respective points of anchorage to a said cutting bar, and power transmission mechanism on the frame for imparting pivotal oscillatory motion to the oscillatory member and the engaged portions of said flexible members.

3. For use with a reciprocatory type mower including a frame, and a pair of cooperating toothed cutting bars mounted on the frame and guided for relative linear reciprocation; an oscillatory member pivoted to the frame in close proximity to said bars and midway between the ends thereof, said oscillatory member having a generally arcuate face concentric with its axis, a flexible power transmission member extending circumferentially about the generally arcuate face of the oscillatory member and having one end portion thereof anchored fast to the oscillatory member, the other end portion of the flexible member extending tangentially from said arcuate face and being anchored to one of the relatively reciprocatory cutting bars, the flexible member extending parallel to the cutting bars from the generally arcuate face of the oscillatory member to its point of anchorage to the toothed cutting bar, power transmission mechanism on the frame for imparting pivotal oscillatory motion to the oscillatory member, the last said mechanism comprising a power-driven crank remote from the oscillatory member and a pitman arm connected at one end to said crank and at its other end to the oscillatory member, the said flexible member pulling its anchored bar in one direction, and means for moving the said bar in the other direction.

4. For use with a reciprocatory type mower including a frame, a finger bar mounted on the frame intermediate its ends, and a sickle bar mounted on the finger bar for linear reciprocation with respect thereto; an oscillatory member pivoted on the frame in close proximity to the center of the sickle bar and having a generally arcuate face concentric with its axis, a pair of flexible power transmission members extending in opposite directions about the generally arcuate face of the oscillatory member, corresponding end portions of the flexible members extending tangentially in opposite directions from the generally arcuate face of said oscillatory member and being anchored to the sickle bar at spaced points longitudinally thereof, the said flexible members extending parallel to the sickle bar from the generally arcuate face of the oscillatory member to their respective points of anchorage to the sickle bar, and power transmission mechanism on the frame for imparting pivotal oscillatory motion to the oscillatory member and the engaged portions of said flexible members.

5. For use with a reciprocatory type mower including a frame, a finger bar mounted on the frame intermediate its ends, and a sickle bar mounted on the finger bar for linear reciprocation with respect thereto; an oscillatory member pivoted on the frame in close proximity to the center of the sickle bar and having a generally arcuate face concentric with its axis, a pair of flexible power transmission members extending in opposite directions about the generally arcuate face of the oscillatory member, one corresponding end portion of each flexible member being anchored fast to the oscillatory member and the other corresponding end portions of said flexible members extending tangentially in opposite directions from the generally arcuate face of the oscillatory member and being anchored to the sickle bar at spaced points longitudinally thereof, the flexible members extending parallel to the sickle bar from the generally arcuate face of the oscillatory member to their respective points of anchorage to the sickle bar, and power transmission mechanism on the frame for imparting pivotal oscillatory motion to the oscillatory member, the last said mechanism comprising a crank element carried by the oscillatory member and a crank operated pitman arm extending from said crank element.

6. For use with a reciprocatory type mower including a frame, a finger bar mounted on the frame, and a sickle bar mounted on the finger bar for linear reciprocation with respect thereto; a slide mounted on the frame for reciprocation in a plane angular to the length of the sickle bar and intermediate the ends thereof, transmission mechanism operatively connected with the slide for imparting reciprocation thereto, an oscillatory member pivoted to the frame intermediate the slide and the sickle bar and having a generally arcuate face, and a pair of flexible members extending in opposite directions about said generally arcuate face and having one corresponding end of each thereof anchored to the slide at spaced points lengthwise of the direction of reciprocation thereof and having their corresponding other ends anchored to the sickle bar at spaced points lengthwise thereof, the flexible members extending substantially parallel to the sickle bar between the generally arcuate face of the oscillatory member and their points of connection with the sickle bar.

7. For use with a reciprocatory type mower and including a frame, a finger bar mounted on the frame, and a sickle bar mounted on the finger bar for linear reciprocation with respect thereto; a slide mounted on the frame for reciprocation in a plane angular to the length of the sickle bar and intermediate the ends thereof, transmission mechanism operatively connected with the slide for imparting reciprocation thereto, an oscillatory member pivoted to the frame intermediate the slide and the sickle bar, said oscillatory member having a generally arcuate segmental rim portion concentric with its axis, a pair of flexible members extending in opposite directions about the generally arcuate rim portion and having one corresponding end of each thereof anchored to the slide at spaced points lengthwise of the direction of reciprocation thereof and having their corresponding other ends anchored to the sickle bar at spaced points lengthwise thereof, both end portions of each flexible member being in planes tangential to said generally arcuate segmental rim portion and one of said flexible members spanning the ends of said segmental rim portion on the inside thereof, and means for adjusting the tension of the flexible members, said means comprising an adjusting device mounted on the oscillatory member for adjusting movements thereon and engaging the portion of the flexible member which spans the space between the ends of the segmental rim portion, and means for locking said adjusting device in different adjusted positions.

8. For use with a reciprocatory type mower including a frame, a finger bar mounted on the frame, and a sickle bar mounted on the finger bar for linear reciprocation with respect thereto; a slide mounted on the frame for reciprocation in a plane angular to the length of the sickle bar and intermediate the ends thereof, transmission mechanism operatively connected with the slide for imparting reciprocation thereto, an oscillatory member pivoted to the frame intermediate the slide and the sickle bar, said oscillatory member having a generally arcuate segmental rim portion concentric with its axis, a pair of flexible members extending in opposite directions about the generally arcuate rim portion and having one corresponding end of each thereof anchored to the slide at spaced points lengthwise of the direction of reciprocation thereof and having their corresponding other ends anchored to the sickle bar at spaced points lengthwise thereof, both end portions of each flexible member being in planes tangential to said segmental rim portion and one of said flexible members spanning the ends of said segmental rim portion on the inside thereof, and means for adjusting the tension of the flexible members, said means comprising an adjusting arm pivoted on the oscillatory member and having lateral engagement with the intermediate portion of that part of the flexible member spanning the space between the ends of the segmental rim portion of the oscillatory member, whereby pivotal movement of the adjusting arm will vary the tension of the cooperating flexible member, and means locking said arm in adjusted positions.

9. For use with a reciprocatory type mower including a frame, a finger bar mounted on the frame, and a sickle bar mounted on the finger bar for linear reciprocation with respect thereto; a slide mounted on the frame for reciprocation in a plane angular to the length of the sickle bar and intermediate the ends thereof, transmission mechanism operatively connected with the slide for imparting reciprocation thereto, an oscillatory member pivoted to the frame intermediate the slide and the sickle bar, said oscillatory member having a generally arcuate segmental rim portion concentric with its axis, a pair of flexible members extending in opposite directions about the generally arcuate rim portion and having one corresponding end of each thereof anchored to the slide at spaced points lengthwise of the direction of reciprocation thereof and having their corresponding other ends anchored to the sickle bar at spaced points lengthwise thereof, both end portions of each flexible member being in planes tangential to said segmental rim portion and one of said flexible members spanning the ends of said segmental rim portion on the inside thereof, means for adjusting the tension of the flexible members, said means comprising an adjusting arm pivoted to the oscillatory member for movements in a plane perpendicular to said axis and having interlocking engagement with the intermediate portion of that part of the flexible member spanning the space between the ends of the segmental rim portion of the oscillatory member, said member having a segmental slot over which the arm operates, and a clamping screw threaded in the arm and working through the segmental slot of said oscillatory member.

10. For use with a reciprocatory type mower including a frame, a finger bar mounted on the frame, and a sickle bar mounted on the finger bar for linear reciprocation with respect thereto; a slide mounted on the frame for reciprocation in a plane angular to the length of the sickle bar and intermediate the ends thereof, transmission mechanism operatively connected with the slide for imparting reciprocation thereto, an oscillatory member pivoted to the frame intermediate the slide and the sickle bar, said member having a generally arcuate segmental rim portion concentric with its axis, a pair of flexible members extending in opposite directions about the member and having one corresponding end of each thereof anchored to the slide at spaced points lengthwise of the direction of reciprocation thereof and having their corresponding other ends anchored to the sickle bar at spaced points lengthwise thereof, both end portions of each flexible member being in planes tangential to said segmental rim portion and one of said flexible members spanning the ends of said segmental rim portion on the inside thereof, means for adjusting the tension of the flexible members, said means comprising an arm pivoted adjacent one of its ends concentrically of the axis of the oscillatory member and working over a surface of said member perpendicular to the axis thereof, a post carried by the said arm and engaging the outer surface of the intermediate portion of that part of the flexible member spanning the space between the ends of the segmental rim portion of said member, and means for releasably locking the arm in adjusted positions.

11. The structure defined in claim 10 in which the means for releasably locking the arm in adjusted positions comprises a clamping screw threaded in the arm and working through a segmental slot in the oscillatory member.

JACOB A. RONNING.

REFERENCES CITED

The following references are of record in the file of this patent:

UNITED STATES PATENTS

| Number | Name | Date |
|---|---|---|
| 796,268 | Troeger | Aug. 1, 1905 |
| 1,200,983 | Quesnell | Oct. 10, 1916 |
| 1,567,013 | Rutishauser | Dec. 22, 1925 |
| 1,599,463 | Flynn | Sept. 14, 1926 |
| 1,620,795 | Black | Mar. 15, 1927 |
| 2,335,541 | Ronning | Nov. 30, 1943 |